United States Patent [19]

Foos et al.

[11] Patent Number: 5,028,402

[45] Date of Patent: Jul. 2, 1991

[54] PROCESS FOR SEPARATING BY MEANS OF CROWN ETHERS THE URANIUM AND PLUTONIUM PRESENT IN AN AQUEOUS MEDIUM RESULTING FROM THE REPROCESSING OF IRRADIATED NUCLEAR FUELS

[75] Inventors: Jacques Foos, Orsay; Pierre Epherre, Saint Cheron; Alain Guy, Pontcarre; Marc Lemaire, Nanterre; Rodolph Chomel, Orange; Gérard Cauquil, Bagnols sur Ceze; Pierre Patigny; Alain Vian, both of Octeville, all of France

[73] Assignee: Cogema Compagnie General des Matieres Nucleaires, Cedex, France

[21] Appl. No.: 367,487

[22] Filed: Jun. 16, 1989

[30] Foreign Application Priority Data

Jun. 16, 1988 [FR] France ................................ 88 08076

[51] Int. Cl.[5] ...................... B01D 11/00; G21C 19/42; C01G 56/00; C01G 43/00

[52] U.S. Cl. ........................................... 423/8; 423/20; 423/251; 252/627

[58] Field of Search ............................. 423/8, 20, 251; 252/627

[56] References Cited

U.S. PATENT DOCUMENTS

| | | | |
|---|---|---|---|
| 3,949,048 | 4/1976 | Holt, Jr. | 423/8 |
| 4,158,616 | 6/1979 | Tomaja | 204/157.1 |
| 4,186,175 | 1/1980 | Tomaja | 204/158 R |
| 4,683,124 | 7/1987 | Muscatello et al. | 423/6 |
| 4,749,518 | 6/1988 | Davis, Jr. et al. | 252/627 |
| 4,759,878 | 7/1988 | Henrich et al. | 252/627 |
| 4,871,478 | 10/1989 | Petrich et al. | 252/627 |

OTHER PUBLICATIONS

Wenji et al., "Extraction of Several Lanthanide and Actinide Radionuclides with Crown Ethers", 1983, J. of Radioanalytical Chemistry, vol. 76, No. 1, pp. 49-62.
Chemical Abstracts, vol. 89, 1978, No. 95789p.
Chemical Abstracts, vol. 97, 1982, No. 61870h.
Chemical Abstracts, vol. 98, 1983, p. 451, No. 167906k.
Chemical Abstracts, vol. 106, 1987, p. 463, No. 126794n.
Chemical Abstracts, vol. 102, 1985, p. 394, No. 68166p.

*Primary Examiner*—Brooks H. Hunt
*Assistant Examiner*—Ngoclan T. Mai
*Attorney, Agent, or Firm*—Pearne, Gordon, McCoy & Granger

[57] ABSTRACT

Process for separating plutonium from uranium contained in a nitric acid aqueous solution from the reprocessing of irradiated fuels comprising plutonium, uranium and fission products by means of crown ethers. Nitric acid aqueous solution (5) containing plutonium, uranium and fission products is contacted at (2) with an organic liquid membrane (3) containing a crown ether. The uranium and plutonium are extracted in the liquid membrane (3) and then transferred by said membrane into a receiving solution (7), which becomes enriched with uranium, because the latter is transferred more rapidly than the plutonium. The crown ether can be DCH 18 C6 or DB 18 C6.

18 Claims, 1 Drawing Sheet

PROCESS FOR SEPARATING BY MEANS OF CROWN ETHERS THE URANIUM AND PLUTONIUM PRESENT IN AN AQUEOUS MEDIUM RESULTING FROM THE REPROCESSING OF IRRADIATED NUCLEAR FUELS

The invention relates to a process for the separation of the uranium and the plutonium present in an acid aqueous solution resulting from the reprocessing of irradiated nuclear fuels.

More specifically, it relates to a process in which the uranium and plutonium are separated from an aqueous solution by extraction and transfer into an organic liquid phase.

For many years the most widely used procedure for reprocessing irradiated nuclear fuels has consisted of dissolving the fuel in a nitric solution, then contacting the nitric aqueous solution obtained with an organic solvent in order to extract the uranium and plutonium therein and for separating most of the fission products, followed by the reextraction of the uranium from the plutonium in an aqueous phase and the separation of the uranium and plutonium present in said aqueous phase by means of an organic solvent. The organic solvent used is generally tributyl phosphate.

Although this solvent gives very satisfactory results, it suffers from the disadvantage of an inadequate resistance to radiation, because it is subject to degradation as a result of radiolysis into products such as dibutyl phosphoric acid, which are prejudicial for the extraction process. Moreover, when the uranium is separated from the plutonium using this solvent, it is necessary to carry out a plutonium reduction stage beforehand, in order to keep the plutonium in an aqueous solution and extract the uranium (VI) in the tributyl phosphate. This involves additional stages and the introduction of reducing and stabilizing agents, which are prejudicial to the remainder of the treatment.

A large amount of research has been carried out on other solvents which might be used in order to avoid these disadvantages.

The present invention aims at a process for the separation of the uranium and plutonium present in an acid aqueous solution resulting from the reprocessing of irradiated nuclear fuels, which makes it possible to carry out the uranium-plutonium separation without it being necessary to reduce the plutonium and which uses an organic ligand having a better resistance to degradation by radiolysis than that of tributyl phosphate.

This process consists of contacting the acid aqueous solution containing the uranium and the plutonium with an organic liquid phase and is characterized in that the organic phase comprises at least one crown ether.

Crown ethers are macrocyclic compounds having complexing properties with respect to numerous metals. Thus, the complexing properties of certain crown ethers with respect to uranium and plutonium were described by Yaskin et al in Dokl. Akad. Nank, SSSR, 241, 159, 1978, but these authors neither described, nor suggested that it was possible to simultaneously separate by means of these crown ethers uranium and plutonium from fission products and selectively extract and transfer the uranium into an aqueous phase for separating it from the plutonium, in the manner described hereinafter.

Thus, Yaskin et al studied the extraction of the uranium, plutonium and neptunium from separate solutions solely containing the element to be extracted and using purified actinide solutions with concentrations of actinide of $5 \times 10^{-5}$ to $5 \times 10^{-6}$ mole/L, which makes it difficult to transpose their results to industrial solutions with high concentrations and acidity. Moreover, they did not investigate solutions simultaneously containing fission products, such as in the case of irradiated fuel reprocessing solutions.

The inventive process can use all crown ether types, e.g. those described in the book by E. Weber "Crown Compounds—Properties and Practice", pp. 34–82. Thus, it is possible to use crown ethers in accordance with the formulas:

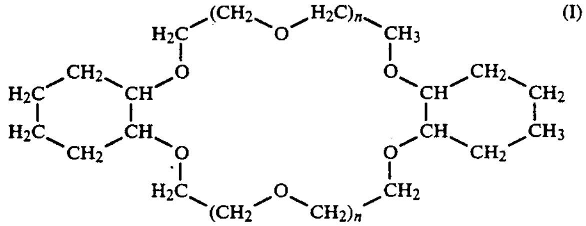

(I)

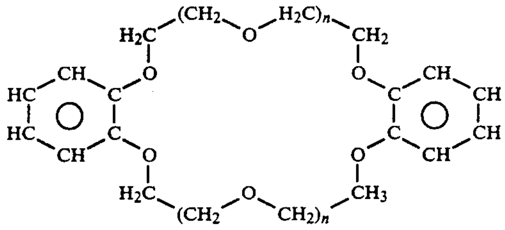

(II)

in which n is equal to 0, or an integer between 1 and 4.

Examples of such crown ethers are those of formula 1 for which n=1 (DCH 18C6) or n=2 (DCH 24C8), and those of formula II for which n=1 (DB 18C6) and n=2.

It is also possible to use crown ethers in accordance with the following formulas:

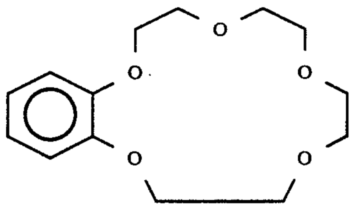

(III)

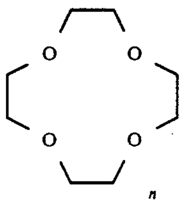

(IV)

-continued (V)

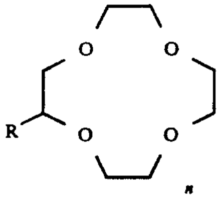

in which n=0. 1 or 2.

Preference is given to the use of crown ethers of formulas (I) of (II) with n=1 or 2, when it is wished to simultaneously perform the uranium-plutonium separation. It is also possible to use the crown ether of formula (IV) with n=2.

These crown ethers are also of great interest, because they have a good resistance to radiation. Thus, no modification was observed to these crown ethers following irradiation for 140th at a dose rate of 120krad/h.

In general, the organic liquid phase is constituted by an organic solvent containing at least one crown ether. The organic solvent can be denser than the aqueous uranium solution, such as e.g. chlorinated solvents such as $CHCL_3$, $CH_2CL_2$, $CCL_3CH_3$, $CHCL_2CHCL_2$ $CLCH_2CH_2CL$ and dichlorobenzene. It is also possible to use organic solvents which are less dense than the aqueous uranium solution, e.g. ether, heptane, dodecane, benzonitrile or aromatic solvents, such as benzene and alkyl benzenes. For example, it is possible to use an organic solvent chosen from among chloroform, methylene chloride, trichloroethylene, aromatic solvents, such as benzonitrile, benzene and alkyl benzenes.

The crown ether concentration of the organic phase is chosen as a function of the solvent so as to selectively extract a maximum plutonium and uranium quantity, whilst leaving the fission products in aqueous solution. A crown ether concentration is chosen in such a way that a perfectly homogeneous liquid phase is obtained, where there is no crown ether crystallization problem.

Generally, with the organic solvents referred to hereinbefore, the organic phase comprises 2 to 33% by volume of crown ethers and 67 to 98% by volume of organic solvent.

The aqueous solutions containing the uranium and the plutonium treated by the process according to the invention are acid solutions obtained either following the dissolving of irradiated nuclear fuels, or following the first separation cycle of uranium and plutonium from fission products. They are generally nitric solutions containing, in the first case, uranium, plutonium and the fission products present in the irradiated fuel dissolving solution and, in the second case, the uranium and plutonium separated from the fission products in a first cycle, such as an extraction cycle by means of tributyl phosphate followed by a reextraction in an aqueous nitric solution.

The nitric acid concentration of the starting solution has an influence on the extraction of the uranium and the plutonium, as well as the uranium-plutonium/fission product separation.

Thus, the U and Pu extraction levels increase with the nitric acid concentration, whereas the fission product extraction level decreases when the nitric acid concentration increases.

In general, 1 to 5 N nitric acid concentrations are used. However, in order to obtain a good plutonium extraction level with a good uranium-plutonium separation, it is preferable to use aqueous solutions containing 1 to 2 mole/L of nitric acid.

The process according to the invention can be realized in different ways as a function of whether or not it is simultaneously wished to carry out the separation of the uranium and plutonium present in the starting aqueous solution.

When it is wished to simultaneously carry out said uranium and plutonium separation, use is made of the organic liquid phase containing the crown ether as the extraction phase and as the means for selectively passing the uranium from the starting aqueous solution into a receiving solution.

Thus, one of the interesting properties of crown ethers is that although they more effectively extract the plutonium than uranium, they much more rapidly transfer the uranium than the plutonium between two aqueous phases. Use can be made of this property for carrying out the uranium-plutonium separation in the first stage of the reprocessing of irradiated fuels.

In this case, the organic liquid phase forms a liquid membrane having first and second contact surfaces. The starting aqueous solution is contacted with the first surface of the liquid membrane and a receiving solution is circulated in contact with the second surface of the liquid membrane in order to selectively transfer the uranium into the receiving solution.

Thus, although the plutonium is extracted with high concentrations in the organic liquid phase, the extraction kinetics of the plutonium is slower than that of the uranium and its transfer speed into the organic liquid membrane is also slower than that of the uranium. Thus, it is possible to concentrate the plutonium in the organic liquid membrane and recover a uranium-enriched receiving solution.

In this embodiment of the process, the aqueous starting solution can be an aqueous solution resulting from the dissolving stage of the irradiated nuclear fuels, which simultaneously contains the uranium, the plutonium and the fission products and in this way it is possible to separate in a single stage the plutonium, the uranium and the fission products without it being necessary to reduce the plutonium.

It is also possible to use as the aqueous starting solution, the aqueous phase containing the uranium and the plutonium presently obtained in irradiated nuclear fuel reprocessing installations following the first fission product separation cYcle. In this case, it is possible to carrY out the uranium-plutonium separation without it being necessary to reduce the plutonium.

In this embodiment of the process according to the invention, the receiving solution can be water or a nitric solution. Generally use is made of a nitric solution with a nitric acid concentration of 1 to 7 mole/L. Thus, as for extraction, a high nitric acid concentration is favourable to the selective elimination of the uranium and the fission products in the receiving solution.

The process according to the invention is performed in conventional contacting equipment and it is standard practice to operate at ambient temperature and under atmospheric pressure.

The contact times and the volumes of solutions which are contacted are chosen as a function of the result which it is wished to obtain. Thus, in the case where it is wished to separate the uranium from the plutonium, the contact times are short, in order that the plutonium is only slightly transferred into the receiving solution.

However, when it is wished to simultaneously extract the uranium and plutonium in the receiving aqueous phase and separate them from the fission products, longer contact times are used.

According to the invention, it is possible to carry out several successive washing operations by nitric solutions of the organic liquid phase in which the plutonium and uranium have been extracted. Thus, it is possible to improve the recovery level or rate and the purity of the plutonium in aqueous solution obtained after reextraction.

BRIEF DESCRIPTION OF THE DRAWINGS

Other features and advantages of the invention can be gathered from studying the following non-limitative examples, with reference to the attached drawings, wherein show.

EXAMPLE 1

This example makes use of crown ether DCH 18C6, i.e. the crown ether of formula (1) with n=1 for treating an aqueous solution containing uranium, plutonium and fission products.

In this example, the starting solution contains 300 g/L of uranium (VI), 1.2 g/L of plutonium (IV) and 32 Ci/L of fission products and has a nitric acid concentration of 1.8 mole/L. In order to carry out the extraction, a volume of said aqueous solution is contacted with two volumes of an organic liquid phase constituted by commercially available crown ether DCH 18 C6, which is a mixture of isomers, diluted in chloroform with a crown ether concentration of 25% by volume. After contacting for 10 minutes, the phases are separated by settling and the plutonium, uranium and fission product concentrations of the organic phase are determined, which makes it possible to calculate the percentages of plutonium, uranium and fission products extracted in the organic phase.

The results obtained are given in Table 1.

TABLE 1

| Ref. | Extractant | % Pu | % U | % PF |
|---|---|---|---|---|
| Example 1 | DCH 18 C6 | 89 | 33 | 0.6 |
| Comparative Example 1 | TBP | 12.5 | 34 | $10^{-4}$ |

Thus, the extracted plutonium percentage is very high representing 89% of the starting plutonium.

COMPARATIVE EXAMPLE 1

This example uses the same operating procedure as in Example 1 for treating an aqueous solution having the same concentrations of uranium, plutonium, fission products and nitric acid, but using as the organic phase tributyl phosphate in TPH (trimethyl-2,4,6-nonane) with a tributyl phosphate concentration of 27.5% by volume. As in example 1, the percentages of plutonium, uranium and fission products extracted in the organic phase are determined. The results obtained are also given in Table 1.

On the basis of these results, it is clear that the process according to the invention makes it possible to significantly improve the plutonium extraction rate, which in the case of the invention passes from 12.5 to 89%.

EXAMPLE 2

Figure 1:
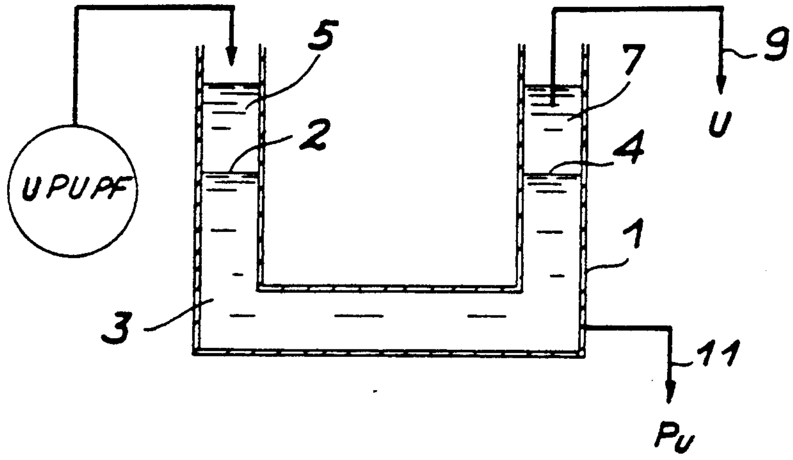
FIG. 1 diagrammatically an installation for the separation of uranium and plutonium by simultaneous extraction and transfer into a liquid membrane.

This example uses the installation diagramnatically shown in FIG. 1 for simultaneously extracting and transferring the uranium from an aqueous reprocessing solution containing uranium, plutonium and fission products and in this way separating it from the plutonium. Said extraction and transfer are carried out through an organic liquid membrane constituted by methylene chloride containing 6% by volume of the crown ether DCH 18 C6 of example 1.

FIG. 1 shows that the apparatus comprises a U-shaped container, on the bottom of which is placed a large amount of organic phase (3) containing the crown ether constituting the liquid membrane. In one of the branches of the U-shaped container, the aqueous solution (5) to be treated containing the uranium, plutonium and fission products is placed above the liquid membrane and in the other branch of the U-shaped container a receiving solution (7) is placed above the liquid membrane (3). Thus, the liquid membrane (3) has a first contact surface (2) with the aqueous solution containing the uranium and plutonium to be extracted and a second contact surface (4) with the aqueous receiving solution.

Under these conditions, the uranium, plutonium and fission products present in the starting aqueous solution (5) are extracted by the liquid membrane (3) and then conveyed by said membrane to the second contact surface (4), where they are reextracted by the receiving solution (7). In the case of liquid membranes according to the invention containing a crown ether, in the organic phase is extracted a very large percentage of the plutonium present in the aqueous starting solution, accompanied by smaller amounts of uranium and fission products. However, the uranium and fission products are more rapidly conveyed through the liquid membrane and are consequently reextracted in the receiving solution (7), whereas the plutonium, which is conveyed more slowly, is concentrated in the liquid membrane.

In this example, the aqueous starting solution contains 3 mole/L of nitric acid, 248 g/L of uranium, 2g/L of plutonium and 137 mCi/L of fission products (pF), the ruthenium used as the tracer and the receiving solution being an aqueous solution containing 1 to 5 mole/L of $HNO_3$. After 150 minutes contacting there is a determination of the concentrations of uranium, plutonium and ruthenium of the receiving solution (7) and the liquid membrane (3), so as to be able to determine the percentages of uranium, plutonium and ruthenium extracted in the different phases. The results are given in Table 2.

TABLE 2

| Distribution of cations after 150 min. | U | Pu | Ru | U/Pu |
|---|---|---|---|---|
| Initial solution (5) | 248 g/L | 2 g/L | 137 mCi/L | |
| Solution (5) after 150 min. | 36% | 6% | 80% | 766 |
| Solution (7) after 150 min. | 65% | 44% | 13% | 178 |
| Liquid membrane (3) after 150 min. | 0% | 50% | 12% | |

These results make it clear that the receiving solution is enriched in uranium and depleted in plutonium.

Thus, by using a separation installation of the type shown in FIG. 1 operating in a continuous manner, it is possible to recover from a pipe 9 at the outlet from the installation a uranium-enriched aqueous solution, whilst a plutonium-enriched organic solution is obtained via pipe 11.

Figure 2:
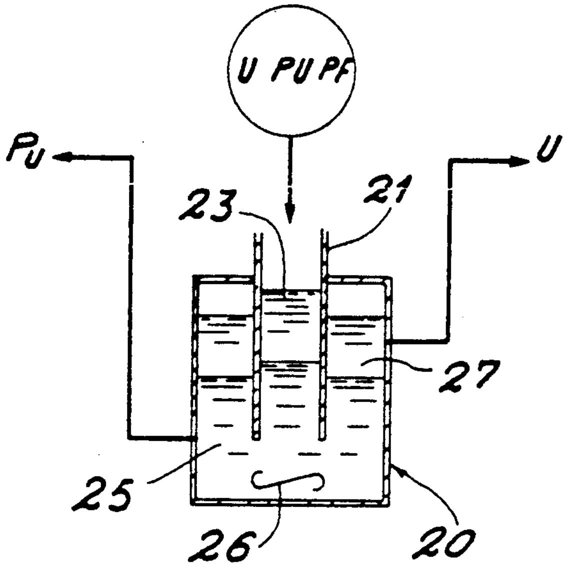
FIG. 2 a variant of the installation according to FIG. 1.

The same result could be obtained using the installation shown in FIG. 2. In this case, the installation has a central shaft (21) through which is introduced the aqueous solution (23) to be treated, which contains the uranium, the plutonium and the fission products. At the bottom of the container is placed the organic phase constituted by the crown ether and the organic solvent, which forms a liquid membrane (25) stirred by the stirrer (26). The receiving solution (27) is introduced into the outer ring.

Under the same conditions, there is in the same way an extraction of the plutonium and the uranium in the organic phase (25) and then the transfer of the uranium into the receiving solution (27).

EXAMPLE 3

This example makes use of the installation shown in FIG. 2 and there is an introduction at (23) of an aqueous solution containing 249g/L of uranium, 2g/L of plutonium and fission products. The liquid membrane (25) is constituted by 1g of DCH 18 C6 of example 1 in 50 ml of $CH_2CL_2$ and the receiving solution (27) is constituted by 30 ml of water.

By carrying out contacting for one day and then determining the respective uranium and plutonium contents of the phases 23, 25 and 27, it was found that approximately 62% of the uranium and 95% of the plutonium initially present were contained in the receiving solution (27), whereas the fission products are only very slightly transferred into the liquid membrane (25).

Thus, by choosing the contact time between the starting aqueous solution, the liquid membrane and the receiving solution, it is possible to ensure either the complete extraction and transfer of the uranium and plutonium, or, as hereinbefore, a selective extraction and transfer of the uranium, whereby by varying the nitric acid concentration of the washing phase it is possible to check and improve the selectivity.

Figure 3:
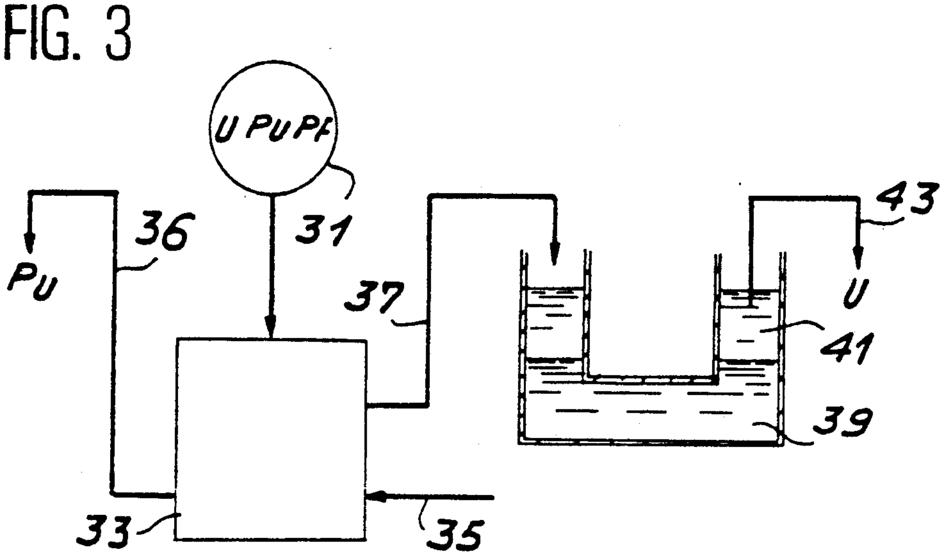
FIG. 3 diagrammatically an installation according to the invention for separating plutonium and uranium from aqueous solutions by successive extraction and transfer.

FIG. 3 diagrammatically shows another installation for performing the process according to the invention, in which successively the plutonium is extracted and the uranium transferred into the aqueous solution.

In this case, the aqueous starting solution (31) containing U, Pu and fission products is firstly contacted at (33) with an organic liquid phase containing a crown ether introduced at (35).

After contacting, an organic phase containing Pu is collected at (36) and a Pu-depleted aqueous phase containing U and fission products is collected at (37).

The uranium present in this aqueous phase (37) is then selectively extracted and transferred by the organic liquid membrane (39) containing a crown ether into the receiving solution (41). It is thus possible to collect a uranium-enriched aqueous solution at (43).

We claim:

1. Process for separating plutonium from uranium contained in a nitric acid aqueous solution comprising plutonium, uranium and fission products, said solution resulting form (1) the dissolving of irradiated nuclear fuels or (b) the first cycle of separating uranium and plutonium form fission products, comprising the steps of contacting said nitric acid aqueous solution with an organic liquid phase containing at least one crown ether to extract plutonium and uranium from said solution, reextracting uranium in water or in a nitric aqueous phase, and recovering the organic phase containing extracted plutonium.

2. Process according to claim 1, wherein the crown ether complies with the formulas:

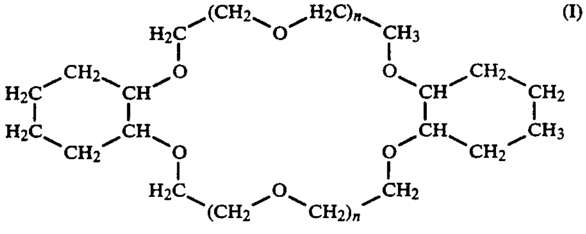

(I)

or

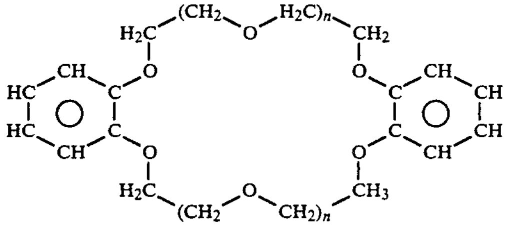

(II)

in which n=0 or an integer between 1 and 4.

3. Process according to claim 2, wherein n is equal to 1 or 2.

4. Process according to any one of claims 1 to 3, wherein the nitric acid concentration of said nitric acid aqueous solution is 1 to 5N.

5. Process according to any one of the claims 1 to 3, wherein the organic liquid phase is constituted by an organic solvent containing at least one crown ether.

6. Process according to claim 5, wherein the organic phase comprises 2 to 33% by volume of one or more crown ethers and 67 to 98% by volume of organic solvent.

7. Process according to any one of the claims 5, wherein the organic solvent is chosen form among chloroform, methylene chloride, trichloroethylene, aromatic solvents such as benzonitrile, benzene and alkyl benzenes.

8. Process for separating uranium and plutonium from an acid aqueous solution resulting from the reprocessing of irradiated nuclear fuels comprising the steps of contacting said solution with an organic liquid phase containing at least one crown ether to extract uranium and plutonium from said solution and transferring uranium and plutonium through the organic liquid phase at different rates to enable separation of extracted uranium and plutonium in the organic liquid phase, and recovering uranium and plutonium extracted in the organic liquid phase.

9. Process for separating uranium and plutonium from an acid aqueous solution resulting from the reprocessing of irradiated nuclear fuels comprising the steps of contacting said solution with an organic liquid phase containing at least one crown ether to extract uranium and plutonium from said solution and transferring uranium at a relatively higher rate than plutonium through the organic liquid phase to selective enable separation of uranium from plutonium in the organic liquid phase, and recovering uranium and plutonium extracted in the organic liquid phase.

10. Process for separating uranium and plutonium from an acid aqueous solution resulting form the reprocessing of irradiated nuclear fuels comprising the steps of providing an organic liquid phase containing at least one crown ether, forming a liquid membrane of said organic liquid phase having first and second contact surfaces, contacting said first liquid membrane contact surface with said aqueous acid solution and circulating a receiving solution in contact with said second liquid membrane contact surface for selectively transferring said uranium into the receiving solution.

11. Process according to claim 10, wherein the crown ether complies wit the formulas:

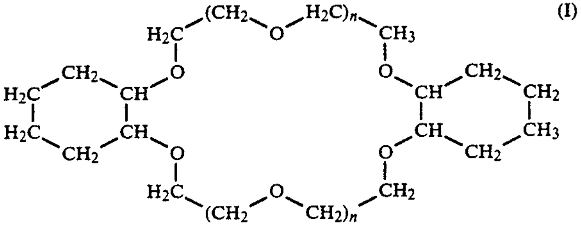

(I)

or

-continued

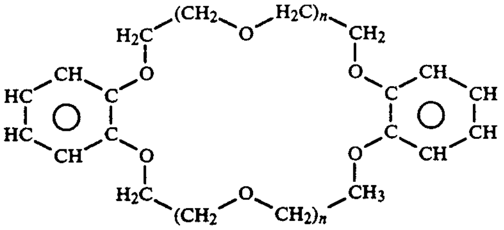

(II)

in which n=0 or an integer between 1 and 4.

12. Process according to claim 11, wherein n is equal to 1 or 2.

13. Process according to any one of the claims 10 to 12, wherein the aqueous acid solution is a nitric solution.

14. Process according to claim 14, wherein the nitric acid concentration of said aqueous solution is 1 to 5N.

15. Process according to any one of the claims 10 to 12, wherein the organic liquid phase is constituted by an organic solvent containing at least one crown ether.

16. Process according to claim 15, wherein the organic phase comprises 2 to 33% by volume of one or more crown ethers and 67 to 98% by volume of organic solvent.

17. Process according to 10, wherein the organic solvent is chosen from among chloroform, methylene chloride, trichloroethylene, aromatic solvents such as benzonitrile, benzene and alkyl benzene.

18. Process according to claim 10, wherein the receiving solution is a nitric solution with a nitric acid concentration of 1 to 7 mole/L.

* * * * *